Nov. 8, 1932.　　　H. C. HIRSCH　　　1,887,129
CONTINUOUS FILTERING APPARATUS
Filed Jan. 13, 1930　　3 Sheets-Sheet 1
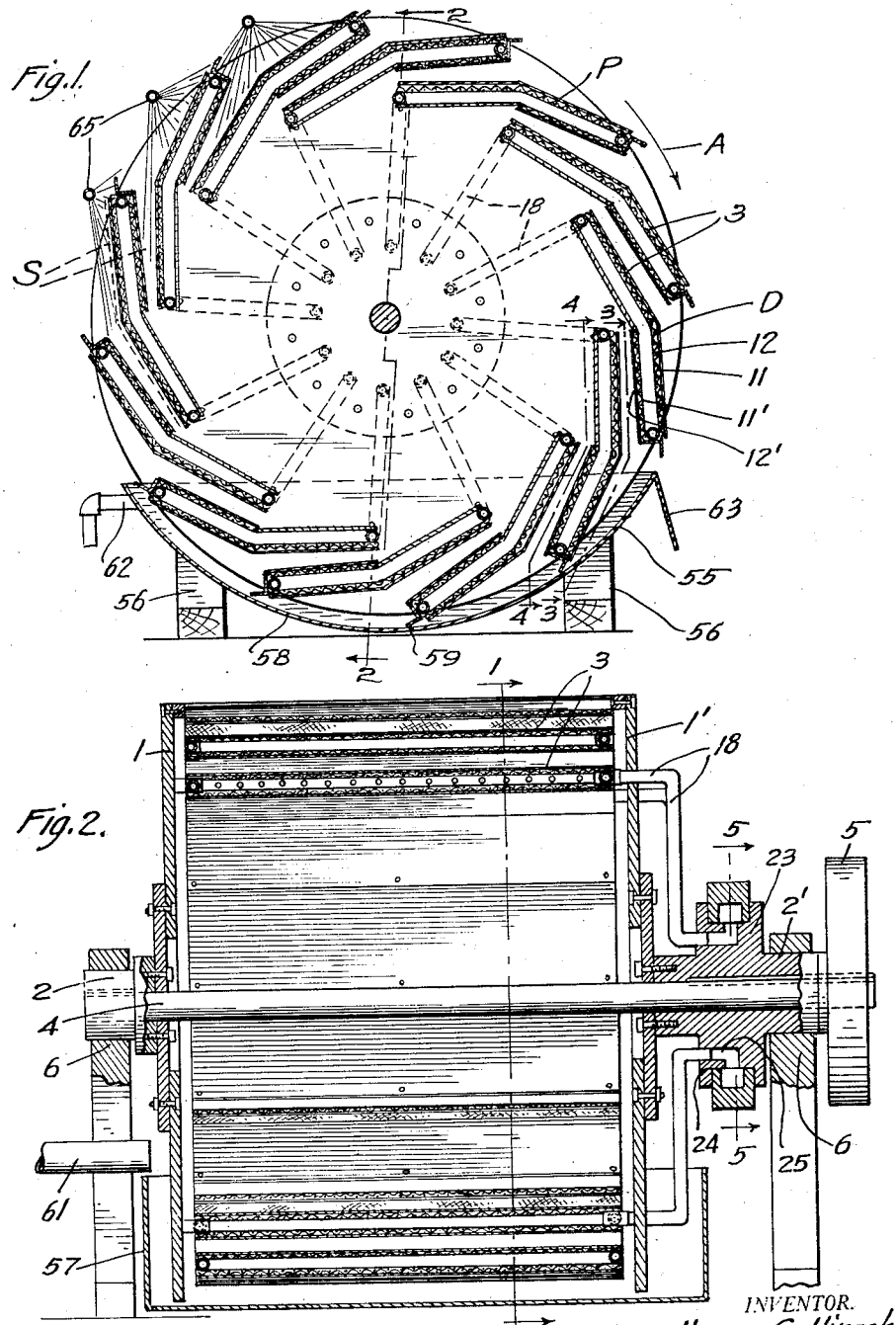

Nov. 8, 1932.    H. C. HIRSCH    1,887,129
CONTINUOUS FILTERING APPARATUS
Filed Jan. 13, 1930    3 Sheets-Sheet 2
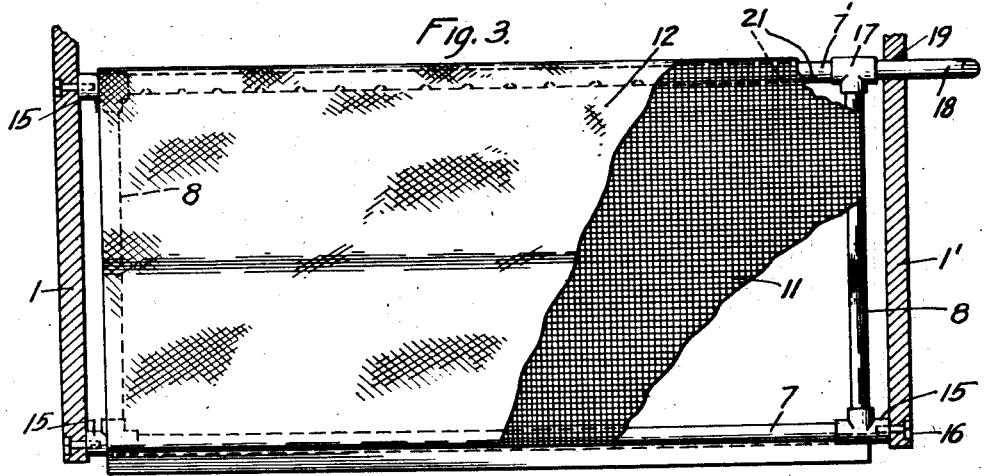
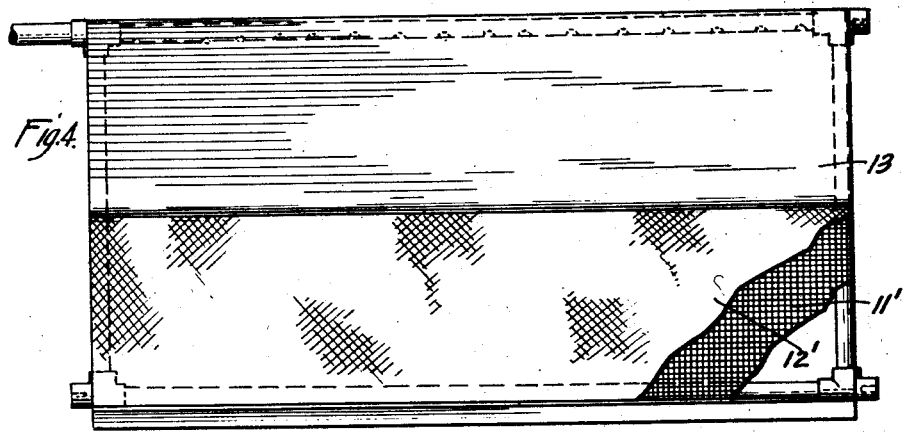
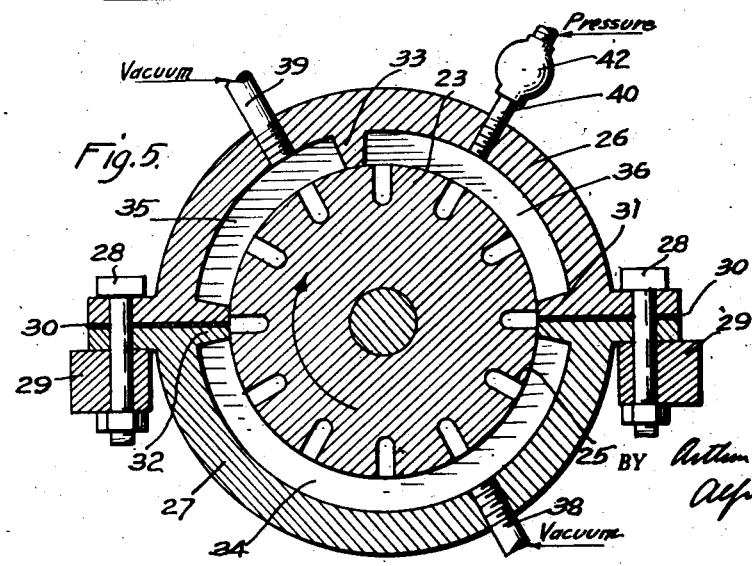
INVENTOR.
Homer C. Hirsch,
BY Arthur P. Knight and
Alfred W. Knight
ATTORNEYS Nov. 8, 1932.  H. C. HIRSCH  1,887,129
CONTINUOUS FILTERING APPARATUS
Filed Jan. 13, 1930  3 Sheets-Sheet 3

INVENTOR.
Homer C. Hirsch,
BY Arthur P. Knight and
Alfred W. Knight
ATTORNEYS

Patented Nov. 8, 1932

1,887,129

UNITED STATES PATENT OFFICE

HOMER C. HIRSCH, OF EL PASO, TEXAS

CONTINUOUS FILTERING APPARATUS

Application filed January 13, 1930. Serial No. 420,514.

This invention relates to continuous filtering apparatus and particularly to continuous filters of the multiple leaf revolving drum type.

The principal objects of the invention are to provide a maximum area for filtration in a filter of this type; to prevent accumulation or settling of sludge or solids in the receptacle in which the sludge is supplied to the exterior of the filter members; to provide for complete drainage of liquid from the interior of the filter members and for separate removal of filtrate and of wash liquid subsequently supplied to the filter members; to provide advantageous means for loosening the solids from the filter means by application of pulsating pressure to the interior of the filter members; to so dispose the filter members with respect to one another that the solids loosened from certain portions of said members fall upon other portions thereof and are carried thereby to the point of discharge of solids; to so dispose the filter members that substantially complete removal of the loosened solids therefrom will be effected by gravity when said members reach such point of discharge of solids; and to provide a simple form of automatic valve means for controlling the application of vacuum and pressure to the interior of the filter members.

The filtering apparatus of my invention comprises essentially a rotatably mounted drum provided with a plurality of filter leaves or members extending longitudinally of the drum and inclined inwardly from the periphery of the drum and rearwardly with respect to the direction of rotation thereof and overlapping one another, a sludge receptacle mounted beneath said drum in such position that said leaves successively enter and leave said receptacle upon each rotation of said drum, and suitable rotary valve means associated with conduits leading to the interiors of the respective filter members for controlling the application of vacuum and pressure through said conduits to said filter members. Each filter member or leaf is preferably inclined inwardly and rearwardly at an angle of less than 45° with respect to the tangent to the periphery of the drum at the outer edge of the filter member, and said filter members are spaced apart by a distance materially less than the width of each filter member so that the outer portion of each filter member overlaps the inner portion of the next preceding filter member. Means are also provided for permitting discharge of solids from the exterior surfaces of the filter members at the downwardly moving side of the drum and before such filter members enter the sludge receptacle, and such discharge of solids is preferably permitted after the outer edges of the respective filter members have passed below the horizontal medial plane of the drum, so that at the point of discharge of solids the respective filter members are inclined inwardly and upwardly at an angle of less than 45° with respect to the vertical, thus facilitating discharge of solids from the surfaces of the filter members by gravity. Other features of the apparatus will be pointed out in the following detailed description thereof.

The accompanying drawings illustrate embodiments of my invention and referring thereto:

Fig. 1 is a transverse section of a filtering apparatus according to my invention, on line 1—1 in Fig. 2.

Fig. 2 is a longitudinal section thereof on line 2—2 in Fig. 1.

Fig. 3 is a view of the outer face of one of the filter members of the apparatus shown in Fig. 1.

Fig. 4 is a view of the inner face of one of said filter members.

Fig. 5 is a transverse section through the rotary valve means, on line 5—5 in Fig. 2.

Figure 6:
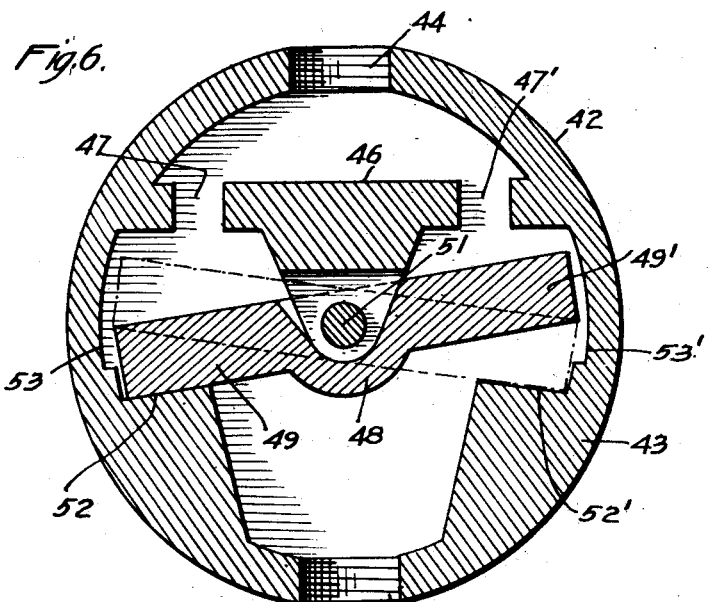
Fig. 6 is a vertical section of the pulsating pressure valve included in the pressure line.

The preferred form of the invention is shown as comprising a drum consisting of circular end plates or discs 1 and 1' secured to trunnions 2 and 2', and a plurality of filter members or leaves 3 extending longitudinally of the drum between said end plates. The trunnions 2 and 2' are keyed, pinned, or otherwise secured in any suitable manner to a shaft 4, to which may also be secured suitable driving means such as pulley 5. Said trunnions are mounted in suitable bearing means 6 which serve to rotatably support the entire drum.

Each filter member comprises a frame of general rectangular shape and formed of any suitably shaped members. I have shown in the drawings a simple type of construction in which said frames are formed of longitudinal pipes 7 and 7' and end pipes 8 secured together at the corners of the frame by fittings such as hereinafter described. Each of said filter leaves extends longitudinally of the drum with the pipe 7 at its outer edge adjacent the periphery of the drum, and is inclined inwardly and rearwardly with respect to the direction of rotation of the drum. The width of each filter leaf is somewhat greater than the space between the outer edges of the leaves, so that the outer portion of each leaf overlaps the inner portion of the next preceding leaf. The entire outer face of each leaf is covered by a suitable filter medium which is shown as comprising an inner or backing layer of wire screen 11 and an outer layer of cloth 12. Furthermore, the inner face of the outer portion of each leaf, that is, of such portion of the leaf as overlaps the next preceding leaf, is also provided with a suitable filter medium which is also shown as comprising an inner layer of screen 11' and an outer layer of cloth 12'. The remainder of the inner face of each leaf is formed by a solid plate 13 of metal or the like, in order to prevent disposition of filter cake on this portion of the leaf. The filter media 11, 11', 12 and 12' as well as plate 13, may be secured to one another and to the frame members in any suitable manner so as to entirely enclose the interior of each filter leaf. Each of the filter leaves above described is preferably inclined inwardly and rearwardly at an angle of less than 45° with respect to the tangent to the periphery of the drum at the outer edge of the leaf. Furthermore, as shown in Fig. 1, the inner portion of each leaf is preferably inclined or bent inwardly at a somewhat greater angle than the outer portion thereof, so that the inclination of the inner portion of each leaf conforms approximately to that of the overlapping outer portion of the next leaf. Such double inclination permits maximum overlapping of the leaves and consequent maximum filtering area without bringing any portions of the filtering surfaces thereof into such close proximity with one another as to interfere with free filtration therethrough.

The leaves may be supported in any suitable manner, but I have shown each frame as provided with T-shaped fittings 15 at the two outer corners and at one of the inner corners thereof, which are secured to the members of the frame and are also secured by bolts 16 to the end plates 1 and 1'. At the other inner corner of each leaf, adjacent the end plate 1', there is provided a hollow T-shaped fitting 17 connected to the adjacent pipes 7' and 8 and also connected to a pipe 18 extending through an opening in said end plate and then extending inwardly and radially toward the trunnion 2' for connection to the rotary valve means hereinafter described.

Means are provided for establishing communication between the interior of each filter leaf and the corresponding connecting pipe 18. Such communication is preferably established through the pipe 7' of each leaf, which extends along the lower edge of the leaf when said leaf is ascending after leaving the sludge receptacle and during the time when removal of liquid from the interior of the leaf is being completed. Such communication may advantageously be established, for example, by means of a series of openings or perforations 21 spaced throughout the length of pipe 7' and at the side thereof which is disposed toward the interior of the filter leaf, as shown in Fig. 3. Each filter leaf is thus provided with a conduit extending along the lower edge of said leaf when at the ascending side of the filter, and communicating with the interior of said leaf, and said conduit also extends inwardly from adjacent one end of the leaf toward the rotary valve means hereinafter described, this arrangement of the conduit serving to facilitate complete removal of liquid from the interior of each filter leaf during each rotation of the filter.

The apparatus also comprises a fixed sludge receptacle 55 mounted on suitable supports 56 beneath the lower portion of the filter drum. Said sludge receptacle comprises end walls 57 and a bottom wall 58 which preferably conforms substantially to the circumference of the filter drum and provides only a relatively small clearance between the outer edges of the filter leaves and said bottom wall. Furthermore, as shown, I prefer to provide a scraping member such as an angle bar 59 secured to, and extending alongside, the outer edge of each filter leaf and having a flange projecting outwardly beyond the edge of the filter leaf so as to scrape along close to the bottom of the receptacle as the filter leaf moves therethrough and prevent accumulation of solids therein. The sludge or other material to be filtered may be supplied to receptacle 55 in any suitable manner, as for example by means of pipe 61, and an overflow pipe 62 may also be advantageously connected to said receptacle somewhat below the upper edge thereof so as to maintain the desired sludge level therein. There is also preferably provided at the side of the receptacle at which the filter leaves enter said receptacle, a lip or flange 63 over which the solids are discharged from the filter leaves, said lip serving to assist in deflecting the discharged solids to any suitable conveying means or other device for disposition thereof.

The valve mechanism for controlling the application of vacuum and pressure to the connecting pipes leading to the respective filter leaves may be of any suitable type, but is shown as comprising a rotary valve member 23 formed as a cylindrical enlargement formed on or secured to the trunnion 2′. Said valve member is provided with an annular recess or groove 24, and the inner end of the several pipes 18 are connected to individual passages 25 in said valve member which open outwardly at the face of said recess or groove. The fixed portion of the valve comprises two substantially semicircular sections 26 and 27 which are placed at the upper and lower sides respectively of the valve member 23. The sections 26 and 27 are disposed within the recess 24 and are clamped together and held in this position by means of bolts 28. Said bolts serve not only to clamp the sections 26 and 27 tightly together so as to maintain a fluid-tight fit between said sections and the valve member 23, but also secure said sections to suitable fixed supporting means 29. Suitable packing means or gaskets 30 may be provided between the casing section 26 and 27. The inner faces of said sections are also provided with recesses or grooves adapted to register with the openings of passages 25, said groove or recesses being shown as divided by inward projections 31, 32, and 33 into three arc-shaped chambers 34, 35 and 36. The inward projections 31 and 32 are shown as located at the juncture between the sections 26 and 27, and may in that case be formed by cooperating inwardly projecting portions on both sections, as shown, although this particular arrangement is not essential to the invention. Pipes 38, 39 and 40 extend through the wall of sections 27 and 26 and communicate respectively with the chambers 34, 35 and 36. The pipes 38 and 39 lead to suitable suction creating or fluid withdrawing means such as are commonly used in connection with vacuum filter apparatus, while pipe 40 is connected to a suitable source of gas under pressure, for example, to an air compressor or the like, such as is also commonly used in connection with apparatus of this type. The chambers 34 and 35, therefore, constitute separate vacuum or suction chambers while the chamber 36 constitutes a pressure chamber. The chamber 34 is located at such position about the axis of rotation of the trunnion as to communicate through the connecting pipes 18 with the respective filter leaves 3 during the main filtering interval, that is, during the time when said leaves are immersed in the sludge receptacle and preferably for a certain period thereafter, while the other suction chamber 35 is so disposed as to communicate with the respective filter leaves during the period of application of water or other washing liquid thereto, after they have left the sludge receptacle. The pressure chamber 36 is so positioned as to communicate with the respective leaves between the termination of the washing period and the point of discharge of solids from the filter leaves and the beginning of the next filtering interval.

If desired, constant gas pressure may be supplied through pipe 40 to chamber 36, but for the purpose of causing vibration of the filter media concurrently with the application of pressure thereto, I prefer to connect a suitable flutter valve 42 in said pipe so as to cause application of pulsating pressure to said chamber. A simple form of construction of such a flutter valve is shown in Fig. 6. The valve there shown comprises a housing 43 having inlet port 44 and outlet port 45, and a partition 46 extending across between said inlet and outlet ports and having two ports or openings 47 and 47′ therethrough. A valve member 48 having arms 49 and 49′ is pivotally mounted at 51 beneath the partition 46. The arms 49 and 49′ are adapted to seat on shoulders 52 and 52′, while the housing is recessed outwardly as shown at 53 and 53′ respectively. Said recesses extend upwardly from a short distance above the respective shoulders 52 and 52′, so that when one or the other of arms 49 and 49′ is in raised position the air or other gas under pressure is permitted to pass through the corresponding port 47 and 47′ and around the end of the valve through the recesses 53 and 53′. For example, when the valve is in the position shown in Fig. 6 the pressure gas is permitted to pass through port 47′ and recess 53′. The motion of the gas past this side of the valve, however, exerts a greater pressure thereon than exists at the other side of the valve, and consequently causes the valve to flop over to the position shown in dotted lines, whereupon gas flow is transferred to the other side of the valve. During this reversing movement, however, there is a short interval during which both arms of the valve are below or close to the lower ends of the corresponding recesses 53 and 53′, so that during each of these intervals the gas flow will be momentarily interrupted or materially diminished. In operation, therefore, the valve will cause a rapid sequence of relatively strong pressure impulses, with intervening intervals of reduced pressure.

Suitable means are also preferably provided for supplying water or other washing liquid to the filter surfaces of the filter leaves subsequent to the emergence of said leaves from the sludge receptacle. Such means may comprise as shown, suitably disposed perforated pipes 65 extending adjacent the periphery of the drum so as to deliver the washing liquid, preferably in the form of a fine spray to the outer surfaces of the layers of solids on said filter leaves, throughout the length of the filter leaves and throughout a certain portion of the rotative movement thereof. The angular position of the leaves at the time of application of such washing liquid corresponding approximately to the position at which the corresponding connecting pipes 18 are in communication with the auxiliary suction chamber 35.

Figure 7:
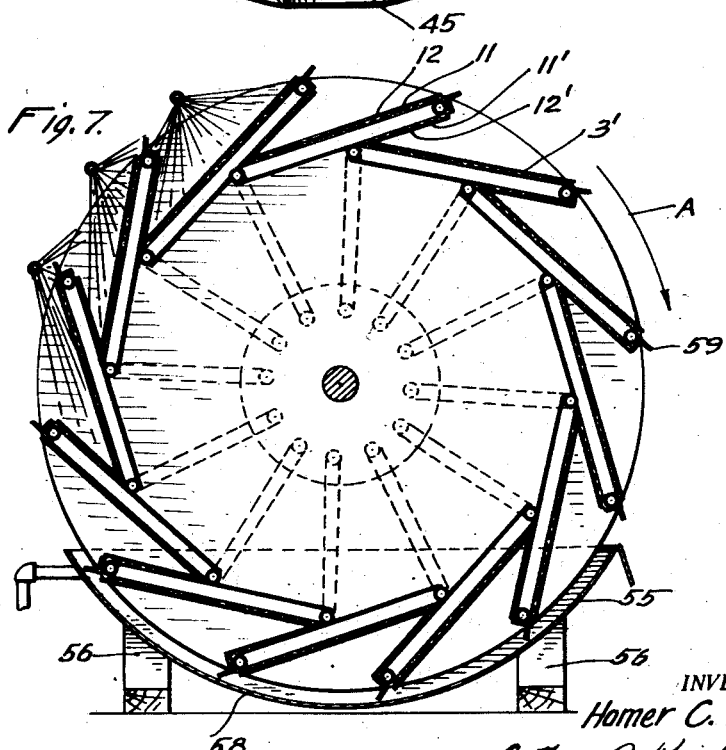
Fig. 7 is a view similar to Fig. 1 showing a slight modification in the shape and disposition of the filter members.

In the modified form of apparatus shown in Fig. 7, the construction is substantially the same as above described with the exception that the inward and rearward inclination of each of the filter leaves 3' is uniform from the outer to the inner edge thereof. As in the other form of the invention, however, the outer face of each filter leaf is provided with a filter media consisting for example of filter cloth 12 and supporting screen 11, and the outer portion of the inner face of each leaf, which overlaps the preceding leaf, is also provided with a filter medium, such as filter cloth 12' and supporting screen 11'. In this case also each filter leaf extends inwardly and rearwardly at an angle of less than 45° with respect to the tangent to the periphery of drum at the outer edge of the leaf.

In the operation of the filtering apparatus above described, with leaves shaped either as shown in Fig. 1 or Fig. 7, the entire drum is rotated by driving means 5 at a suitable rate of speed in the direction indicated by the arrow at A in Fig. 1 and Fig. 7. The material to be filtered, consisting, for example, of a sludge such as obtained in the well known cyanide process or, in general, of any mixture of solid and liquid materials which it is desired to separate from one another, is supplied through pipe 61 at a sufficient rate to maintain a body of such material up to the desired level in the receptacle 55. The proper sludge level may advantageously be maintained by supplying the material thereto at a rate somewhat greater than the rate of filtration so as to cause a continual overflow of the excess material through overflow pipe 62.

As the drum rotates, the respective filter leaves 3 successively enter and pass through the body of sludge in receptacle 55. Substantially at the time each filter leaf enters the sludge, the corresponding passage 25 in valve member 23, rotating in the direction indicated by the arrow in Fig. 5, comes into communication with the main suction chamber 34 thus causing a suction to be created in the interior of said filter leaf, which in turn causes the liquid constituent of the sludge to pass through the filter media of such leaf while the solid constituents are deposited upon the outer surfaces of such filter media, in well known manner. The liquid thus entering the filter leaves passes through the pipes 18 and passages 25 to the suction chamber 34 whence it is continuously removed through the vacuum pipe 38. The filtration of liquid and accumulation of solids on the filter leaves continues until the leaves emerge from the sludge receptacle at the upwardly moving side of the drum. At a suitable point in the rotation of the drum, the respective passages 25 pass out of communication with the main suction chamber 34 and into communication with the auxiliary suction chamber 35. This change preferably takes place somewhat after the emergence of the filter leaf from the sludge so as to provide a sufficient interval thereafter for removal of the major portion of the liquid constituent or filtrate from the layer of solids on the outer surfaces of the filtering media and from the interior of the filter leaf. It will be observed that by placing of the pipe 7' through which the filtrate is removed from the interior of the filter leaf, at the inner edge of said leaf, said pipe is caused to be at the bottom of the filter leaf at the upwardly moving side of the drum, so as to permit substantially complete drainage of filtrate from said filter leaf to said pipe and through the connecting pipe 18 prior to the breaking of communication with the main suction chamber.

A layer of separated solids is thus formed over the entire outer face of each filter leaf and over the outer portion of the inner face thereof, as indicated for example by the dotted line at S in Fig. 1. As the leaves move upwardly at the left side of the drum in Fig. 1, water or other washing liquid is supplied through spray pipes 65 to the outer surfaces of the layer of separated solids thereon, and since the leaves are at this time under suction supplied either through the main suction chamber 34 or the auxiliary suction chamber 35, such washing liquid is drawn through the solids to substantially remove therefrom the liquid constituent of the sludge retained thereby. It is evident that the filtrate obtained during this washing period will be more dilute with respect to any soluble constituents contained in the liquid portion of the sludge, than the filtrate obtained during the main filtering interval, and it is for the purpose of keeping this more dilute filtrate substantially separate from the main more concentrated filtrate that the separate suction chambers 34 and 35 are provided. As in the case of the main filtrate, the more dilute washing filtrate will also be substantially completely drained from each filter leaf through the pipe 7' and the corresponding connecting pipe 18, prior to the breaking of communication with the auxiliary suction chamber 35, this drainage being rendered especially complete by reason of the downward inclination of the connecting pipe 18 from the pipes 7' to the rotary valve mechanism when at this position.

After the washing of the solids on each filter leaf and the substantially complete removal of washing liquid therefrom is completed, the filter leaf commences to move downwardly at the right side of the drum, and at this time the corresponding passage 25 is brought into communication with the pressure chamber 36 of the valve. Due to the action of the flutter valve 42, a pulsating pressure is thus established in the interior of the filter leaf, which serves not only to force the air or other pressure medium out through the filter medium and blow the layer of solids, commonly known as the "filter cake", loose from said filter medium, but also serves to rapidly vibrate or shake the filter medium, which still further facilitates the loosening of the solid materials therefrom. It may be pointed out that the relation between the frequency of pulsations caused by the flutter valve 42 and the time interval during which the interior of each filter leaf is in communication with the pressure chamber 36 is such that a plurality of such pulsations and consequent vibrations of the filter medium occur during each such time interval. The solid materials thus loosened from the filter medium at the outer face of each leaf are carried around thereon until the downward inclination of the leaf becomes sufficient to cause such solids to slide or fall by gravity therefrom. The solids discharged from the filter medium at the outer portion of the inner face of each filter leaf, on the other hand, fall upon the outer face of the preceding leaf, it being evident that the overlapping of the leaves is sufficient so that when each leaf reaches the position of application of pressure thereto, for example, approximately the position of the leaf indicated at P in Fig. 1, the portion of the inner face of such leaf, which is covered by filter medium, entirely overhangs part of the outer face of the preceding leaf. It will be noted that the impervious metal plate extending over the inner portion of the inner face of each leaf prevents filtration therethrough, and consequently prevents formation of filter cake over this portion of the inner face, and it is quite evident that the reason for this is that, if filter cake were permitted to form on this portion of the inner face, it would spill back into the sludge receptacle upon being loosened when pressure was supplied to the interior of the leaves.

As the downward movement of each filter leaf continues, the inclination thereof with respect to the horizontal increases. By disposing each filter leaf so that the inclination thereof with respect to the tangent at the outer edge thereof is less than 45° and by placing the upper edge of the sludge receptacle and the position of the discharge lip 63 somewhat below the horizontal plane to the axis of the drum, as shown, the outer face of each filter leaf upon which the loosened solids are carried is eventually caused to have an inclination from the horizontal of materially in excess of 45° prior to the time at which said leaf reaches the point at which the discharge of solids must be completed, that is, the point at which it is about to reenter the sludge receptacle. It is evident, for example, that in the leaf indicated at D in Fig. 1, the outermost portion of the outer face is almost vertical, while the inner portion of the outer face slopes at approximately 50° or more from the horizontal, while the inclination of the leaf considered as a whole from the outer to the inner edge thereof is materially in excess of 45°. This relatively steep inclination of the leaves at this position is of great advantage in causing substantially complete removal of the solids from the filtering surfaces by the action of gravity, in conjunction with the continued loosening action of the pulsating pressure. After the discharge of solids is completed, the leaf passes out of communication with the pressure chamber and again into communication with the main suction chamber, whereupon a new cycle is begun.

It will be noted as a further advantage of the above construction that in the passage of the leaves through the sludge in the receptacle 55, said leaves serve as paddles to continually agitate the sludge and prevent settling of solids therefrom to the bottom of the receptacle. Furthermore, the substantial conformity of the bottom wall of the receptacle to the periphery of the drum provides a minimum space for accumulation of solids, and this effect is made even more positive by the action of the scraping members 59 at the outer edges of the filter leaves.

I claim:

1. A continuous filtering apparatus comprising a rotatably mounted drum, a plurality of filter leaves extending longitudinally of said drum and inclined inwardly from the periphery of the drum and rearwardly with respect to the direction of rotation thereof and overlapping one another, each of said filter leaves being provided with filter medium extending over the outer face thereof and over that outer portion of the inner face which overlaps the inner portions of the next preceding leaf and with an impervious wall extending over the remainder of the inner face thereof, a sludge receptacle mounted beneath said drum in such position that said leaves successively enter and leave said receptacle upon each rotation of said drum, conduit means communicating with the interior of the respective filter leaves and extending inwardly toward the center of the drum, and rotary valve means associated with the inner ends of said conduits for controlling application of vacuum to said conduits when the corresponding leaves are in position within said receptacle, and application of pressure to said conduits when the corresponding leaves are at a position outside said receptacle.

2. A continuous filtering apparatus comprising a rotatably mounted drum, a plurality of filter leaves extending longitudinally of the drum and inclined inwardly from the periphery of the drum and rearwardly with respect to the direction of rotation thereof and overlapping one another, the inner portion of each of said filter leaves being inclined inwardly at a greater angle than the outer portion thereof, a sludge receptacle extending beneath said drum in position to maintain a body of sludge in contact with said filter leaves when at the lower part of the drum, conduit means communicating with the interior of the respective filter leaves, and rotary valve means cooperating with said conduit means to control application of vacuum to the respective filter leaves when said filter leaves are at the lower part of the drum.

3. A continuous filtering apparatus comprising a rotatably mounted drum, a plurality of filter leaves extending longitudinally of said drum and inclined inwardly from the periphery of the drum and rearwardly with respect to the direction of rotation thereof and overlapping one another, each of said filter leaves being provided with filter medium extending over the outer face thereof and over that outer portion of the inner face thereof which overlaps the inner portion of the next preceding leaf and with an impervious wall extending over the remainder of the inner face thereof, a sludge receptacle beneath said drum in position to maintain a body of sludge in contact with the filter surfaces of said filter leaves when at the lower portion of the drum, conduit means communicating with the interior of the respective filter leaves, and rotary valve means cooperating with said conduit means to control application of vacuum to the interior of the respective filter leaves when at the lower part of the drum and application of pressure to the interior of said filter leaves when at the upper part of the drum and at the downwardly moving side thereof.

4. A continuous filtering apparatus comprising a rotatably mounted drum, a plurality of filter leaves extending longitudinally of said drum and inclined inwardly from the periphery thereof and rearwardly with respect to the direction of rotation thereof, each of said filter leaves being provided with filtering medium on both its inner and outer surfaces, a receptacle beneath said drum having a curved bottom wall conforming substantially to the periphery of said drum and extending close to the outer edges of said filter leaves, said receptacle being adapted to maintain a body of sludge surrounding said filter leaves when at the lower part of the drum, a scraping element extending along the outer edge of each filter leaf and having the outer edge of said scraping element disposed to pass in close proximity to said curved bottom wall of the sludge receptacle and to prevent accumulation of solids thereon during rotation of said drum, and means for applying suction to the interior of the respective filter leaves when in contact with said body of sludge.

In testimony whereof I have hereunto subscribed my name this 16th day of December, 1929.

HOMER C. HIRSCH.